Figure 4:
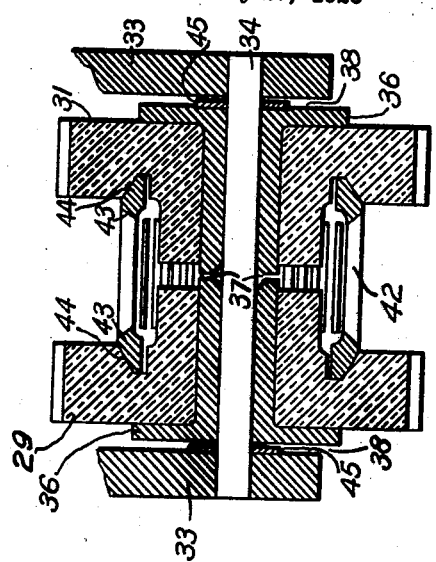

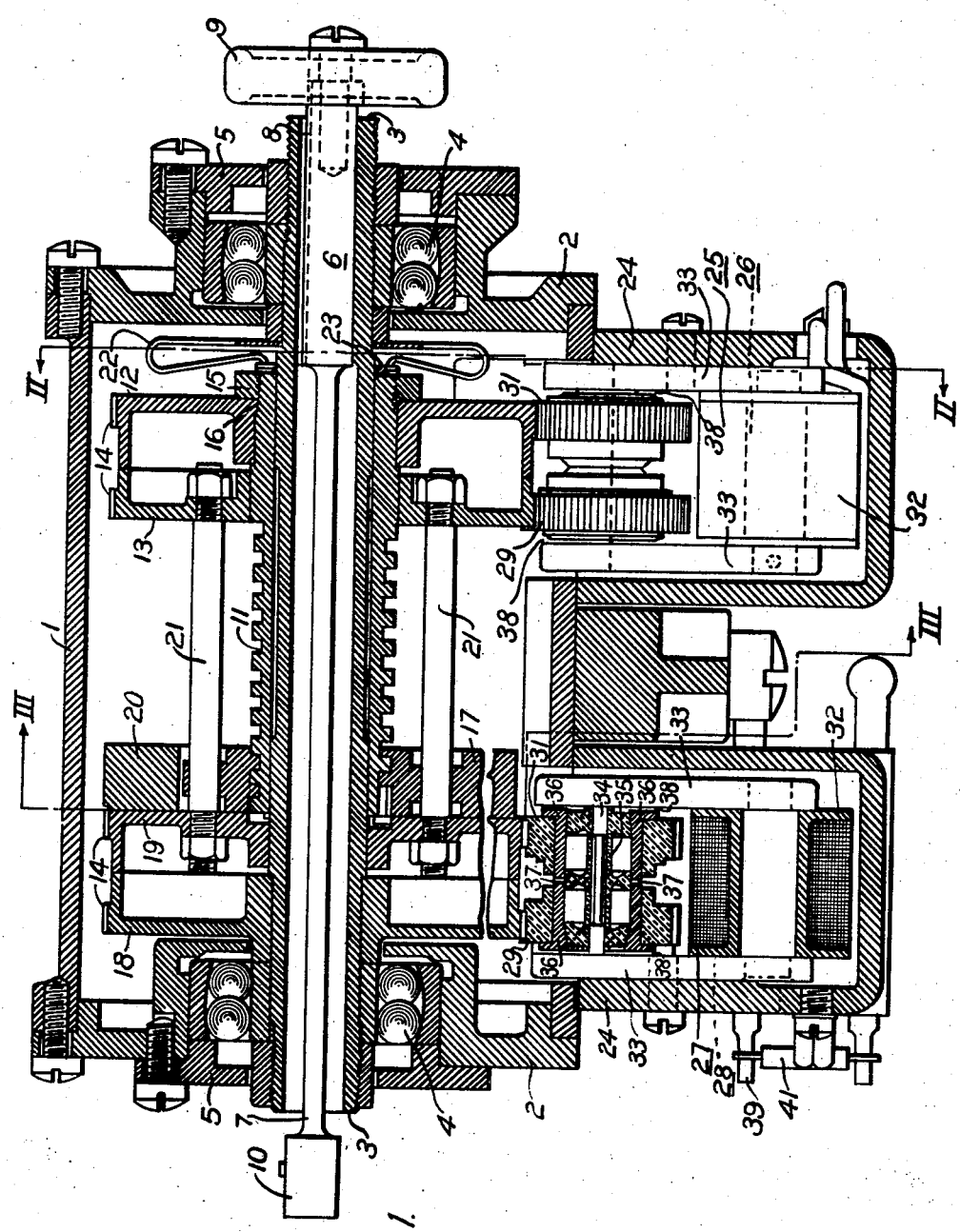

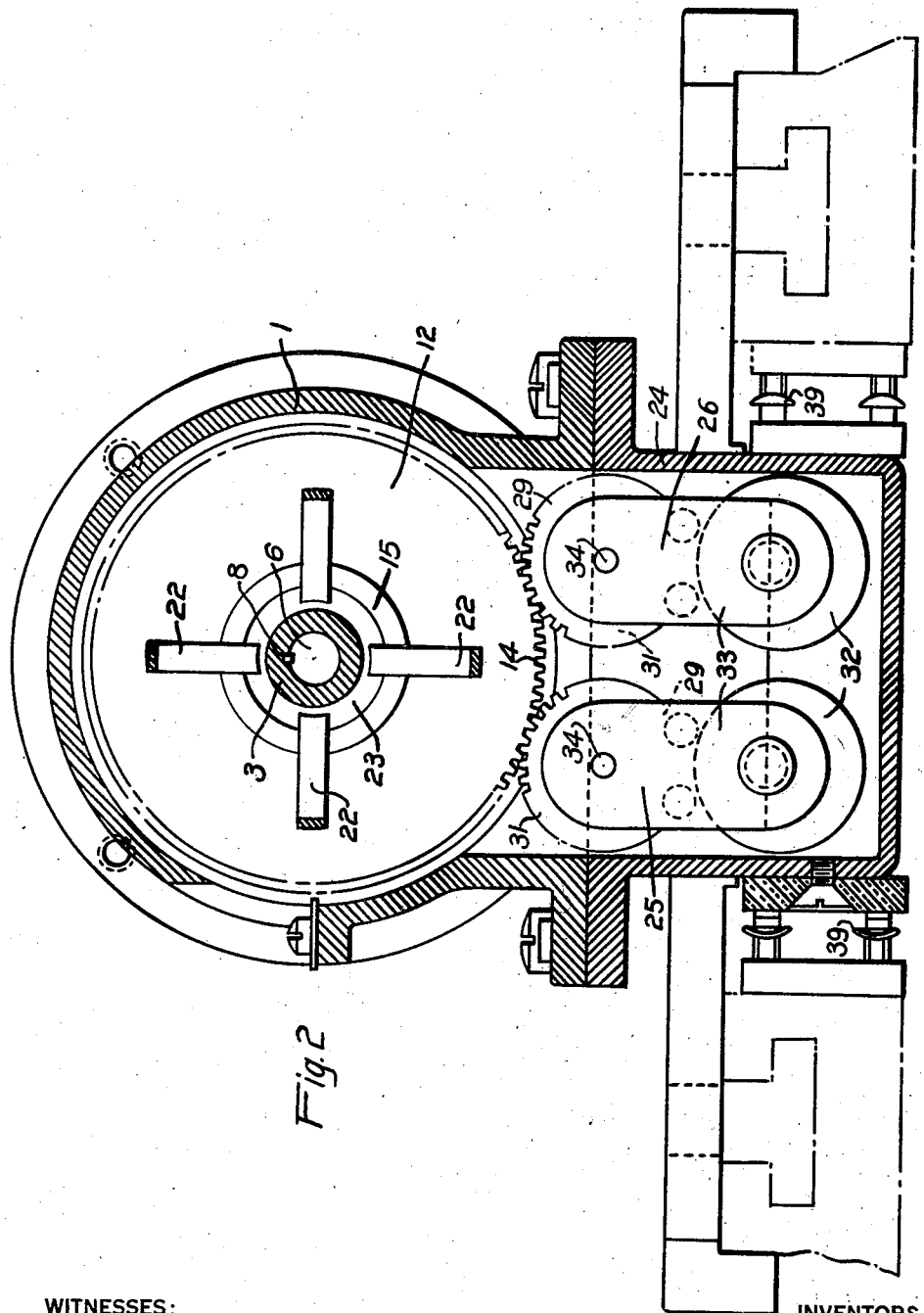

April 16, 1929.  W. E. TRUMPLER ET AL  1,709,694
BALANCING MACHINE
Filed May 27, 1926  3 Sheets-Sheet 3

WITNESSES:
A. G. Schiefelbein.
W. D. O'Connor

INVENTORS
Carl Richard Soderberg and
William E. Trumpler.
BY
Chesley G. Carr
ATTORNEY Patented Apr. 16, 1929.

1,709,694

UNITED STATES PATENT OFFICE.

WILLIAM E. TRUMPLER, OF WILKINSBURG, AND CARL R. SODERBERG, OF EDGEWOOD, PENNSYLVANIA, ASSIGNORS TO WESTINGHOUSE ELECTRIC & MANUFACTURING COMPANY, A CORPORATION OF PENNSYLVANIA.

BALANCING MACHINE.

Application filed May 27, 1926. Serial No. 111,922.

Our invention relates to balancing machines, more particularly to apparatus for testing the dynamic unbalance of rotors and the like.

It is among the objects of our invention to provide a counterbalancing mechanism for balancing machines which shall provide simple and efficient means for ascertaining the nature and amount of the unbalanced masses in rotors, with a minimum amount of regulation of the balancing apparatus, thus making the balancing operation of rotors commercially practicable without increasing the cost of their manufacture.

Another object of our invention is to provide a counterbalancing mechanism which shall be adapted to provide very fine adjustments of the counterbalancing weights, so as to produce extremely accurate results in the balancing of rotors.

Another object of our invention is to provide relays for adjusting the phase relation of parts in a balancing machine while it is rotating, without disturbing the oscillating bed member.

Another object of our invention is to provide a counterbalancing mechanism for balancing machines of the above-designated character which shall be of compact and durable mechanical construction and which shall comprise a minimum number of operating parts, said parts being designed to eliminate excessive wear or the probability of destruction thereof.

In the copending application of W. E. Trumpler Serial No. 725,352, filed July 11, 1924, is described counterbalancing mechanism for balancing machines which embodies magnetic relays for controlling the adjusting and regulating mechanism that changes the relative position of the counterbalancing weights with respect to the parasite or unbalanced mass in the rotor being tested.

The object to be accomplished with such a device is to eliminate all of the manual control members from the operating portion of the machine, that is, the parts constituting the portion of the oscillating bed member upon which the test member is mounted.

Our present invention is directed to an improved form of relay, for regulating the counterbalance mechanism, which is more positive in its operation of regulating the relative disposition of the counterbalanced weights and more easily operated, thus eliminating the loss of time that has been incurred in the adjustment of such weights in devices of the prior art.

In the afore-mentioned pending application, there is described a plurality of friction disks operative through the relay mechanism, which disks are associated with a pair of movable weights that are adjustable to effect a couple in opposition to the dynamic couple that is produced by the unbalanced masses in the rotor being tested. In our present device, we utilize toothed gearing for securing more positive regulation of the weights.

The weight-regulating mechanism comprises disks provided with gear teeth on their outer periphery, and pinions for engaging the disks. Magnetic means are used for coupling the pinions to a flexible element that provides for slight angular deflections between them, to make the torque transmitted more nearly uniform. The magnetic coupling also provides for slippage between the pinions to relieve excessive stresses and prevent breakage of the gear teeth or other damage to the sensitive machine elements.

Figure 3:
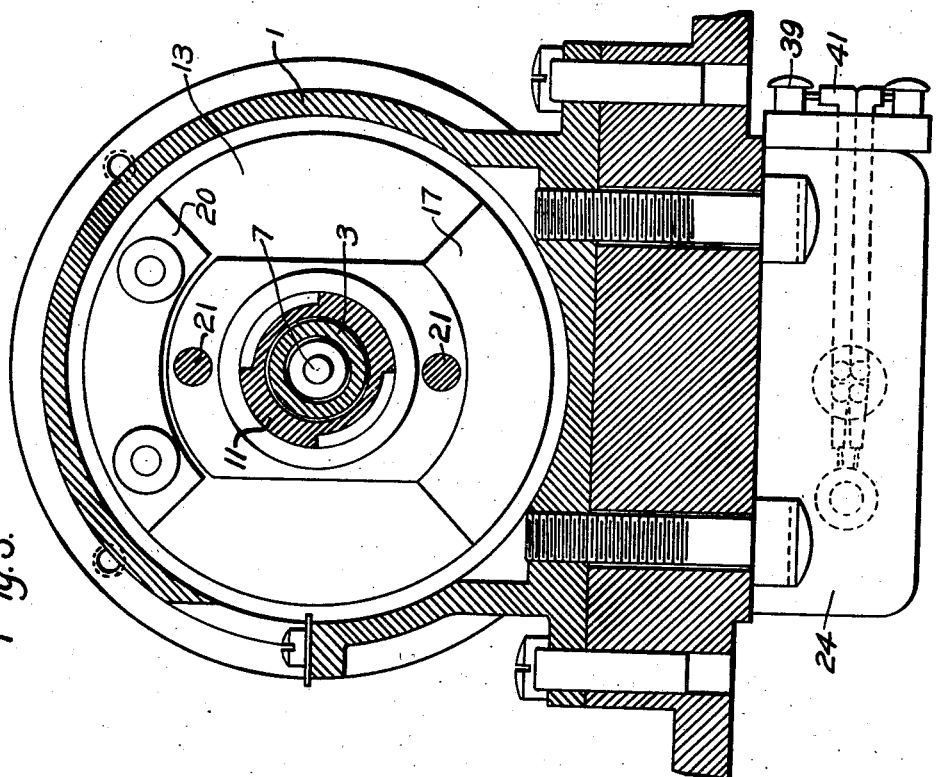

In the accompanying drawings, constituting a part hereof and in which like reference characters designate like parts, Fig. 1 is a view in longitudinal section of a counterbalancing mechanism embodying the principles of our invention, Fig. 2 is a view, partially in transverse section and partially in end elevation, of the device shown in Fig. 1, taken along the line II—II thereof, Fig. 3 is a similar view taken along the line III—III of Fig. 1, and Fig. 4 is a view in section of a modified form of gear mechanism adapted to be embodied in the device shown in Fig. 1.

Referring to Fig. 1, the structure therein illustrated comprises a cylindrical housing or casing 1 that is provided with end brackets 2 for rotatably journalling a hollow spindle 3 that is carried by a plurality of anti-friction bearings 4, which are secured in the brackets 2 by end caps 5. A shaft 6, having a restricted body portion 7, is disposed within the hollow spindle 3 and is secured to one end thereof by a spline connection 8.

A hand-wheel 9 is secured on one end of the shaft 6 and a chucking member 10 on its other end for engaging and securing the end of a rotor (not shown) that is journaled coaxially with the shaft 6 on an oscillatable bed member (not shown) to which the housing 1 is secured. A screw sleeve 11 is journalled on the hollow spindle 3 and a pair of abutting flanged disks 12 and 13, provided with gear teeth 14 on their outer peripheries, are respectively secured to and journalled on the sleeve member 11. The disk 12 is secured against a shoulder of the sleeve 11 by a ring nut 15 which interacts with an auxiliary threaded portion 16 of the member 11. An eccentric weight 17, having an internally threaded portion complementary to the main thread on the screw sleeve member 11, is mounted thereon and adapted to cooperate with the main threaded portion of the sleeve 11 to provide for displacement of the weight 17 in an axial direction.

A pair of abutting flanged disks 18 and 19, also provided with gear teeth 14, are respectively secured to and journalled on the hollow spindle 3, and a counterbalance weight 20 is secured on the disc 19 in opposition to the weight 17 that is operative on the sleeve member 11. The weights 17 and 20 are oppositely positioned, as shown in Fig. 3, and are maintained in angular spaced relation under all operating conditions. The flanged disks 13 and 19 are maintained in spaced relation by a plurality of bolts 21, which extend through openings provided in the counter-weight 17. A spring member 22 acts against a washer 23 that maintains pressure in an axial direction against the screw sleeve 11, thus providing frictional engagement between the disks 12 and 13 and the disks 18 and 19, respectively.

Rectangularly shaped housings 24 are secured to the casing 1 for supporting creeping relays 25 and 26 that engage the disks 12 and 13 and creeping relays 27 and 28 that engage the disks 18 and 19, for effecting phase displacement therebetween.

The creeping relays 25, 26, 27 and 28 comprise pinions 29 and 31 that engage the toothed peripheries 14 of the disks and electromagnets 32 for so coupling the pinions 29 and 31 that they rotate at the same speed. The magnets 32 are provided with pole-pieces 33 at their opposite ends that carry small shafts 34 on which are mounted the pinions 29 and 31 and flexible couplings 35. Each shaft 34 is provided with a restricted body portion to reduce the magnetic path and to provide a space for the accumulation of lubricant. The flexible couplings 35 comprise non-magnetic sleeves provided with conical end portions.

The pinions 29 and 31 are preferably of non-metallic material, such as micarta, and are provided with soft steel bushings 36 having tapered internal bores complementary to the conical end portions of the flexible couplings 35. Air gaps 37 are provided between the bushings 36 when they are journalled in operating position on the flexible coupling 35, and air gaps 38 of much larger cross sectional area exist between the bushings 36 and the pole-pieces 33, the air gaps 37 being preferably shorter than the air gaps 38.

When one of the magnets 32 is energized, flux traverses a path from the pole pieces 33 through the air gaps 38 to the bushings 36 and through the air gap 37. On account of the greatly restricted area of the intermediate air gap 37 the magnetic pull between the two bushings 36 is far greater than between the bushings 36 and the pole-pieces 33. The magnetic pull forces the bushings 36 against the conical end portions of the coupling 35 and produces frictional engagement therewith, thereby coupling the bushings 36 and the pinions 29 and 31 together. The couplings 35 are made torsionally flexible by reducing the diameter of certain portions for the purpose of equalizing the slight irregularities resulting from the tooth engagement between the gear teeth 14 and the pinions 29 and 31.

The magnets 32 are provided with terminals 39 which are electrically connected by leads 41 to an electric power circuit for energizing the magnet coils. By the control of the electromagnets that is effected by the energization and deenergization of the coils, the magnetic flux across the gap 37 between the pinion members 29 and 31 is regulated.

The pinions 29 and 31 are of the same diameter, but pinion 31 embodies one tooth more than pinion 29, to provide different gear ratios between the pinions and disks with which they cooperate. Accordingly, for the same speed of the pinion members 29 and 31, there will be a difference in the speed of the cooperating disk members 12 and 13, or 18 and 19 to the extent of one tooth advance or retardation, thus effecting a relative angular motion of the disks comprising each pair.

As long as the magnets 32 are deenergized, the pinions 29 and 31 have a relative rotative motion because of the difference in tooth ratios of the discs and pinions, and in this condition there is no creepage or angular movement between the respective disk members.

The pinion 31 of relay 25 engages the disk 12, and the pinion 29 of the same relay engages the disk 13. When the magnet 32 is energized and the pinions 29 and 31 are coupled to rotate at the same speed, the relay 25 causes the disk 12 to rotate faster than the disk 13.

In the relay 26, the pinion 31 engages the disk 13 and the pinion 29 engages the disk 12 and when the relay is energized, it causes the disk 12 to rotate slower than the disk 13. It is, therefore, possible to effect an angular displacement between the disks 12 and 13 in either direction while they are rotating.

The relays 27 and 28, in cooperation with the gear teeth 14 of the disks 18 and 19, likewise serve to effect an angular displacement in either direction between said disks.

The operation of the balancing unit is briefly as follows: The disks 13 and 19 and counterweights 17 and 20 are rotated with the shaft 6, with which they are engaged, and the hollow spindle 3. The spindle 3 is connected to the rotor to be tested, which is actuated by a belt drive or otherwise from a suitable motor or other driving device. The disks 12 and 18 rotate at the same speed because of their frictional engagement with the disks 13 and 19, respectively, which is effected by the axial pressure supplied by the spring action of the elements 22 against their respective engaging faces, and the pinion members 29 and 31 are rotated through their gear-teeth engagement with the aforementioned disks.

By operating relay 27 or 28 a phase displacement may be effected between disks 18 and 19 in either direction and, therefore, the angular position of the pair of counterweights 17 and 20 with respect to the spindle 3 may be varied. By operating the relays 25 and 26 and effecting displacement between the disks 12 and 13, the threaded member 11 is caused to interact with the weight 17 and thereby effect an axial displacement thereof with respect to the weight 20, thereby establishing a dynamic couple that may be adjusted to oppose the couple established by the unbalanced mass in the rotor to which the shaft member 6 is connected. The direction and amount of axial movement of the weight 17 is varied by operating either one of the relays 25 and 26, since the tooth ratios of the disks and pinions are arranged to provide creepage between the disks in opposite directions, so that the weight 17 may traverse the thread of the sleeve member 11 in either direction, as shown in Fig. 1.

The pinion members shown in Fig. 4 operate in identically the same manner as those shown in Figs. 1 and 2, the only difference being in their construction. The flexible member, instead of being constituted by the sleeve 35, which was internally located, is replaced by a cage member 42, which is a cylinder having a number of slots in its mid portion and conical ends 43 for engaging complementary depressions 44 in the pinions 29 and 31. Nonmagnetic washers 45 are inserted between the bushings 36 and the pole-pieces 33 to maintain the proper minimum air gap. Magnetic force between the bushings 36 at the air gap 37 tends to draw the pinions together and sets up a frictional resistance between the depressions 44 and the conical ends 43 of the cage 42, thereby coupling the two pinions to rotate as a unit. By virtue of the slotted construction of the cage 42, a certain amount of flexibility is introduced between the pinions to absorb shocks caused by irregular tooth forms or other causes.

It is evident from the foregoing description of our invention that a counterbalancing mechanism made in accordance therewith provides an efficient and positive means for regulating the balancing weights to efficiently balance rotors being tested, and that such a device, although positive in its operation, will permit of high-speed manipulation of the regulating mechanism without the clashing of gear-wheels and without subjecting the more delicate operating parts to any severe strain or wear.

Although we have described a specific embodiment of our invention, it will be obvious to those skilled in the art that various modifications may be made in the details of construction and in the arrangement and size of the several cooperating parts without departing from the principles herein set forth.

We claim as our invention:

1. In a counter-balance mechanism, a variable couple comprising a plurality of movable weights, gear-wheels associated with said weights, means for rotating said gear-wheels and weights, and magnetic means for effecting relative rotary movement of said gear-wheels to displace said weights.

2. In a counter-balance mechanism, a variable couple comprising a pair of movable weights, gear-wheels associated with said weights, means for rotating said gear-wheels and weights, and magnetic means for effecting relative rotary movement of said gear-wheels to vary said couple.

3. In a counter-balance mechanism, a variable couple comprising a pair of movable weights, gear-wheels associated with said weights, means for rotating said gear-wheels and weights, and magnetic means for effecting relative rotary movement of said gear-wheels to displace said weights.

4. In a counter-balance mechanism, a variable couple comprising a pair of movable weights, gear-wheels associated with said weights, means for rotating said gear-wheels and weights, and magnetic means for effecting relative rotary movement of said gear-wheels to displace said weights in an axial direction.

5. A counter-balance mechanism comprising a hollow shaft, a spindle disposed therein and engaged thereby at one end thereof, a plurality of friction disks provided with gear teeth mounted on said shaft, counter-weights operatively connected to said disks, gear-wheels engaging said disks, means for rotating said disks and gear-wheels simultaneously, and means for providing relative rotative movement of said disks and gear-wheels.

6. A counter-balance mechanism comprising a hollow shaft, a spindle disposed therein and engaged thereby at one end thereof, a plurality of friction disks provided with gear teeth mounted on said shaft, counter-weights operatively connected to said disks, gear-wheels engaging said disks, means for rotating said disks and gear-wheels simultaneously to provide rotatory movement of said weights, and means for providing relative rotative movement of said disks and gear-wheels to provide radial displacement of said weights.

7. In a counter-balance mechanism, a variable couple comprising a pair of movable weights, gear-wheels associated with said weights, means for rotating said gear-wheels and weights, and magnetic means for effecting relative rotary movement of said gear-wheels to displace said weights, said magnetic means comprising magnet coils, pole-pieces therefor, and a yieldable mounting for some of the gear-wheels, the flux from said magnetic means serving to couple the gear wheels so mounted.

8. In a counter-balance mechanism, a variable couple comprising a pair of movable weights, gear-wheels associated with said weights, means for rotating said gear-wheels and weights, and magnetic means for effecting relative rotary movement of said gear-wheels to displace said weights, said magnetic means comprising a plurality of cup-shape sleeves mounted upon a complementary shaped non-magnetic support, a pair of pinion members provided with an air-gap therebetween mounted on said sleeves, pole-pieces associated with said sleeves, and magnet coils for setting up a magnetic flux through said sleeves and across said gap to effect a yielding couple between said pinion members.

9. In a counter-balance mechanism, a variable couple comprising a plurality of movable weights, gear-wheels associated with said weights, means for rotating said gear-wheels and weights, pinions engaging said gear-wheels and a clutch disposed to couple said pinions for effecting relative rotary movement of said gear-wheels to displace said weights.

10. In a counter-balance mechanism, balancing weights, gear-wheels associated with said weights, pinions engaging said gear-wheels, and magnetic means for coupling said pinions.

11. In a machine for balancing a rotor, balancing weights for balancing an oscillating system, gear-wheels associated with said balancing weights and said rotor, pinions engaging the gear-wheels and a clutch disposed to couple said pinions for varying the phase relation between the balancing weights and said rotor.

12. In a device for effecting phase displacement, disks having toothed peripheries, means for providing frictional engagement between said disks, pinions engaging the toothed peripheries of said disks at different ratios, and magnetic means for coupling said pinions to provide creepage between said disks.

13. In a device for effecting phase displacement, gear-wheels having equal numbers of teeth, pinions having differing numbers of teeth for engaging the gear-wheels, and magnetic means for coupling the pinions.

14. In a device for effecting phase displacement between two elements of a rotatable mechanism, friction means for coupling the elements to rotate in synchronism, a gear wheel on each of the elements, said gear wheels having equal numbers of teeth, pinions having unequal numbers of teeth in engagement with the gear wheels and means for coupling the pinions to cause them to rotate as a unit.

15. A device for effecting phase displacement between elements of a machine while the elements are rotating that comprises gear wheels having equal numbers of teeth mounted on each element, pinions having unequal numbers of teeth disposed to engage the gear wheels and magnetic means for locking the pinions to rotate as a unit.

In testimony whereof, we have hereunto subscribed our names this 18th day of May, 1926.

WILLIAM E. TRUMPLER.
CARL R. SODERBERG.